United States Patent
Sahm et al.

(10) Patent No.: US 8,561,273 B2
(45) Date of Patent: Oct. 22, 2013

(54) TOOL TURRET

(75) Inventors: Detlef Sahm, Reichenbach/Fils (DE); Matthias Beck, Metzingen (DE)

(73) Assignee: Sauter Feinmechanik GmbH, Metzingen (DE)

( * ) Notice: Subject to any disclaimer, the term of this patent is extended or adjusted under 35 U.S.C. 154(b) by 1018 days.

(21) Appl. No.: 12/461,518

(22) Filed: Aug. 13, 2009

(65) Prior Publication Data

US 2010/0056351 A1 Mar. 4, 2010

(30) Foreign Application Priority Data

Aug. 30, 2008 (DE) .......................... 10 2008 045 181

(51) Int. Cl.
*B23P 23/00* (2006.01)
*B23B 39/20* (2006.01)

(52) U.S. Cl.
USPC ................................. 29/40; 29/42; 74/813 R

(58) Field of Classification Search
USPC ................ 29/40, 39, 42; 74/813 R, 819, 824; 408/35; 451/362
See application file for complete search history.

(56) References Cited

U.S. PATENT DOCUMENTS

| 4,302,870 A * | 12/1981 | Schalles et al. ................... 29/40 |
| 4,563,925 A * | 1/1986 | Link .............................. 82/142 |
| 7,971,328 B2 * | 7/2011 | Sahm et al. ...................... 29/40 |

FOREIGN PATENT DOCUMENTS

| DE | 28 49 167 B2 | 5/1980 |
| DE | 39 29 803 C1 | 1/1991 |
| DE | 689 08 208 T2 | 3/1994 |
| DE | 10 2005 033 890 A1 | 1/2007 |

* cited by examiner

*Primary Examiner* — Erica E Cadugan
(74) *Attorney, Agent, or Firm* — Roylance, Abrams, Berdo and Goodman LLP

(57) ABSTRACT

A tool turret, with a base body (1) attachable to a machine tool defines a turret axis (13) around which the tool disk (7) is pivoted on the base body (1). The disk has a plurality of tool stations (45) distributed on its periphery. Turning the tool disk (7) can set it into at least one working position at a time. A tool drive (31, 35) located within the tool disk (7) with its output-side gear part (35) can be turned around an axis of rotation radial to the turret axis (13). By coupling, the tool device engages the tool-side coupling part for driving at least one tool located on the tool station (45) aligned to the working position. The output-side gear part (35) is located in the tool disk (7) to be pivotable around the turret axis (13). The tool disk (7) has a clutch (47) which can be switched between a first operating position in which the output-side gear part (35) for pivoting motion around the turret axis (13) is connected to the tool disk (7), and a second operating position in which the output-side gear part (35) is decoupled from the tool disk (7).

11 Claims, 3 Drawing Sheets

TOOL TURRET

FIELD OF THE INVENTION

The invention relates to a tool turret, with a base body which is attached or is to be attached to a machine tool and which defines a turret axis around which the tool disk is pivoted on the base body. The disk has a plurality of tool stations distributed on its periphery. By turning the tool disk, the tool disk can be set into at least one working position at a time. In this working position a tool drive, located within the tool disk and having its output-side gear part rotatable around an axis of rotation radial to the turret axis, engages the tool-side coupling part for driving at least one tool located on the tool station aligned to the working position. The output-side gear part is mounted in the tool disk to be rotatable around the turret axis.

BACKGROUND OF THE INVENTION

DE 689 08 208 T2 or DE 10 2005 033 890 A1 discloses tool turrets intended for use in machine tools such as lathes, machining centers and similar devices. When using such tool turrets, the tools to be used and located on the tool stations of the tool disk are both stationary tools such as cutting tools and the like, as well as rotary tools for machining process such as drilling, milling and the like. In this case, rotary driving for the pertinent rotary tool located on the tool station in the working position takes place by an internal tool drive whose output-side gear part can be engaged by coupling by the pertinent, tool-side coupling part when the tool station to which the rotary tool is attached is in a defined working position.

Fixing the angular setting of this defined working position relative to the base body is disadvantageous in some cases. While in rotary machining, a fixed angular setting of the working position is advantageous because metal cutting is always done centered on the workpiece axis, it is also often desirable to be able to perform drilling or milling even outside of the fixed angular setting, with the feed or machining direction not being at a right angle to the workpiece axis.

DE 39 29 803 C1 discloses a generic tool turret, in particular for automatic lathes, with tool holders for tools which can be driven in rotation. In the known solution, a turret head on a turret body is pivoted around the turret axis and can be locked in several working positions. At least one tool holder is interchangeably attached to the turret head and has a rotary clamping device for a tool and a spindle for driving the clamping device with a gear wheel located within the turret head. In the turret head, a drive shaft parallel to the turret axis is movably mounted axially and can be loaded with a hydraulically generated axial force. The drive shaft bears a gear wheel by which the spindle can be driven in one working position of the turret head. The drive shaft is pretensioned with a small axial force for purposes of starting the two gear wheels, and only after engaging the two gear wheels can it be fixed in the axial direction with hydraulically generated force.

DE 28 49 167 B2 shows a generic tool turret solution comparable to the aforementioned solution. There is no clutch within the tool disk in the known generic solutions.

SUMMARY OF THE INVENTION

An object of the invention is to provide an improved tool turret with which machining processes can be carried out by rotary tools not only when the tool disk is set to a defined working position, but also in those cases in which the tool disk is in any desired rotary position.

According to the invention, this object is basically achieved by a tool turret where in the tool disk clutch makes it possible to couple the output-side gear part for a pivoting motion around the turret axis to the tool disk. The output-side gear part in the corresponding operating position of the clutch, when the tool disk is being turned into the desired rotary position, can be entrained by the tool disk, which makes it possible to work with rotary tools in the desired different angular positions. On the other hand, in the pertinent operating position of the clutch, the output-side gear part can be decoupled from the tool disk, making it possible to move another tool into the working position. If the output-side gear part, with which a rotary tool to be driven engages its tool-side coupling part, is located in the tool disk to be pivotable around the turret axis, in different angular positions it can form the drive for the respective rotary tool.

In preferred embodiments, the clutch as a movable coupling part has a bushing forms a rotary support of the output-side gear part for its rotation around the radial axis of rotation and is arranged to be able to move radially between a first operating position and a second operating position in the tool disk. In the first operating position, the rotary support assumes a radially advanced position in which, with radially end-side drivers, engages the driver surfaces of the tool disk. The double function of the bushing both for supporting the output-side gear part of the tool drive and as the movable coupling part of the clutch leads to an extremely compact construction in which the tool drive and the clutch can be housed without difficulty within the installation space available in the tool disk.

Especially advantageous embodiments are characterized by an especially simple and compact design. The output-side gear part as a further component of the clutch together with the bushing can be radially moved in the tool disk such that in the second operating position it assumes a position which is shifted radially to the inside and in which it is secured on the base body against pivoting motion around the turret axis. However, the output-side gear part can be turned around its radial axis of rotation. In interaction with the base body, a defined initial angular position for machining processes both with stationary tools and with rotary tools is then established when the clutch is in the second operating position. Rotary motions of the tool disk for adjustment purposes can be undertaken here without the output-side gear part of the tool drive being entrained out of this defined initial position. If the clutch is transferred into the first operating position, the output-side gear part can in turn be entrained with the rotary motion of the tool disk into the desired position in which the rotary tool is to be operated.

The tool drive can be designed as an angle drive with a drive-side crown gear rotatable around the turret axis, with teeth which lie in the radial plane. The crown gear radial extension is chosen such that the teeth of the output-side gear part in its radial displacements between the first and second operating position permanently engage the teeth of the crown gear. The tool drive can therefore be active regardless of the operating position the clutch is in.

Preferably, the base body has a central support column which defines the turret axis and around which the tool disk is pivoted. Within the tool disk a guide body on which the movable components of the clutch, such as the bushing and the output-side gear part pivoted in it, are guided both for radial movements between the operating positions and also for pivoting movements around the turret axis.

Especially little installation space is required, if the clutch can be transferred into the operating positions using a hydraulic medium, preferably by hydraulic actuation.

The bushing on the outer peripheral side can have a projecting ring body which, as a moveable annular piston, separates from one another the pressure chambers made on the guide body in the guide section on which the bushing is guided for the displacement motions between the operating positions. The pressure chambers can be selectively supplied with hydraulic medium to transfer the clutch into the operating positions by movement of the bushing.

Preferably the drive-side crown gear of the tool drive is mounted on a hollow shaft surrounding the support column. On the end region of the hollow shaft adjacent to that end of the support column away from the tool disk, a pinion which sits on the hollow shaft is geared to the output gear of the drive motor.

The drive for the rotary motion of the tool disk around the turret axis can be a torque motor located coaxially to it. Its rotor is connected to the tool disk for direct driving of it.

In order to fix the tool disk in the desired adjustment position without slip, between the base body and the tool disk, preferably a clamping mechanism is provided, preferably actuation taking place hydraulically.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
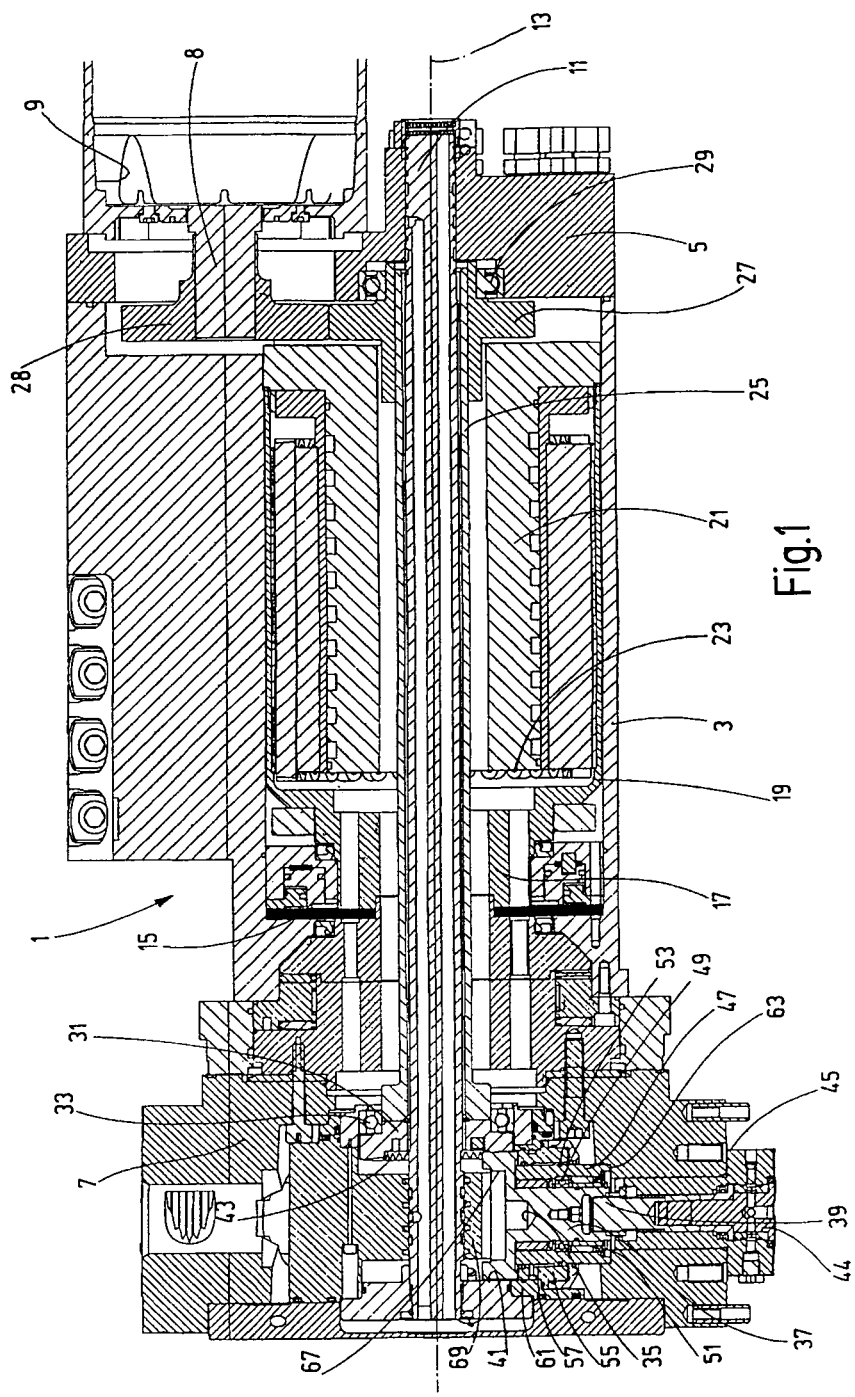
FIG. 1 is a side elevational view in section of a tool turret shown slightly schematically simplified according to one exemplary embodiment of the invention and FIGS. 2 and 3 are enlarged and schematically simplified cut away perspective views of the interior of only the tool disk of the embodiment of FIG. 1, with FIG. 2 showing the clutch in the first operating position and FIG. 3 showing the clutch in the second operating position.

The embodiment of the tool turret shown in the drawings has a base body 1 with a turret housing 3 which on one end is closed with a housing cover 5 and whose other end is connected to the tool disk 7. On the housing cover 5, an electric drive motor 9 is flanged, of which only a partial section adjoining its output shaft 8 is shown. On the housing cover 5, moreover, a support column 11 forming part of the base body 1 is attached with its one end. Its other end extends into the interior of the tool disk 7. The support column 11 defines the turret axis 13 around which the tool disk 7 is pivoted on the base body 1. In order to fix the tool disk 7 in selected rotary positions without slip relative to the base body 1, between the bordering flat surfaces of the base body 1 and the tool disk 7, specifically, on the turret housing 3 and on the tool disk 7, a clamping mechanism 15, shown schematically simplified only in FIG. 1, is installed and can be clamped hydraulically as is conventional for these devices. This mechanism is not detailed in FIG. 1. For setting the angular positions of the tool disk 7 around the turret axis 13, a torque motor 21 concentrically surrounds the support column 11. The motor outer rotor 19 is connected to the tubular body 17 of the tool disk 7 which extends into the interior of the turret housing 3. The inside stator of the motor 21 has a stator winding 23 connected to the turret housing 3 for rotation.

The rotary actuator for a tool drive located within the tool disk 7 is a hollow shaft 25 surrounding the support column 11. On the shaft end adjacent to the housing cover 5 sits a drive pinion 27. The hollow shaft 25 is supported on the housing cover 5 by an antifriction bearing 29. The pinion 27 with its teeth engages the pinion gear 28 on the output shaft 8 of the motor 9. On the other end of the hollow shaft 25, a crown gear 31, and, accordingly, the hollow shaft 25 itself, are supported on the guide body 61 by another antifriction bearing 33.

Figure 2:
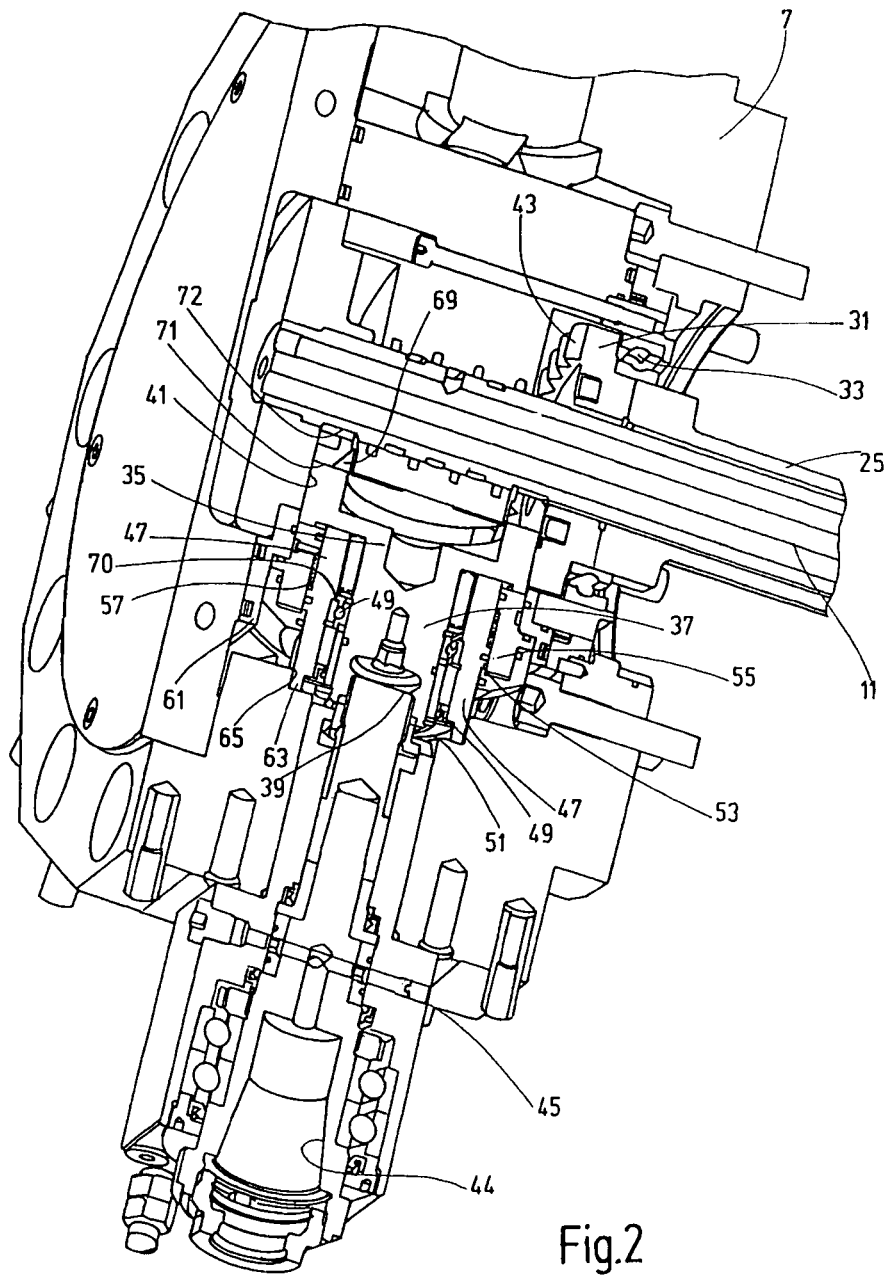
Figure 3:
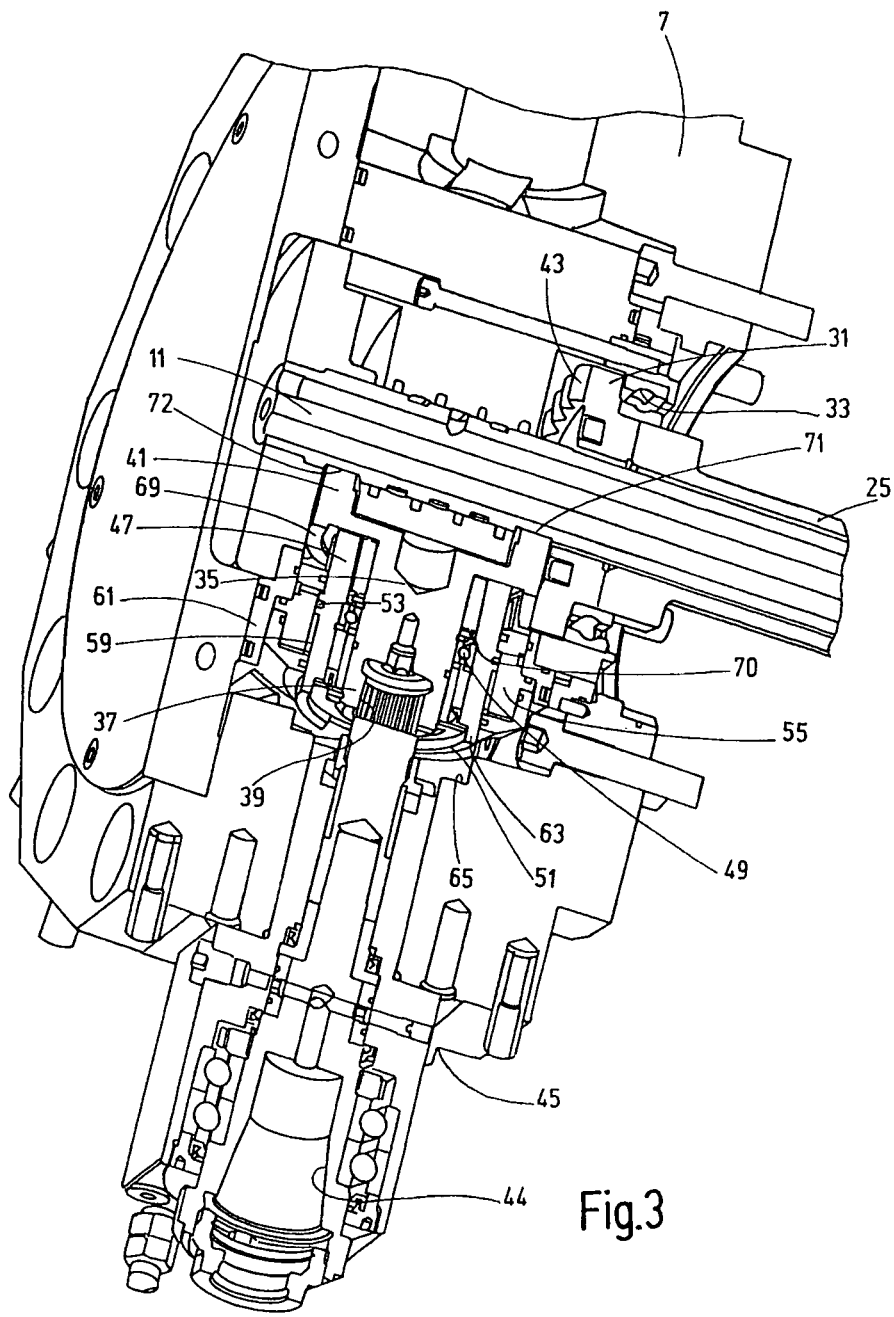

The crown gear 31 forms the drive-side part of the tool drive located within the tool disk 7. Its details and the details about the clutch located within the tool disk can be more clearly viewed in FIGS. 2 and 3. The output-side gear part which interacts with the crown gear 31 is a body of revolution 35. Body of revolution 35 has a shaft 37 concentric to its axis of rotation and forming a rotary coupling part 39 with a tool-side coupling part for the rotary actuator of a rotary tool (not shown). The rotary coupling part is located on one tool station 45 in a tool holder 44. On its end opposite the shaft part 37, the body of revolution 35 forms an outside gear rim 41 which concentrically surrounds the axis of rotation and which engages the teeth 43 of the crown gear 31. The teeth 43 on the crown gear 31 in the radial plane has an extension which is chosen such that the gear rim 41 is permanently engaged with the teeth 43, regardless of whether the body of revolution 35 is radially set by a radial displacement motion into a position corresponding to the first operating position or a position corresponding to the second operating position of the clutch. FIGS. 1 and 2 each show the body of revolution 35, i.e., the output-side gear part of the tool drive in the radial position corresponding to the first operating position of the clutch, while FIG. 3 shows the body of revolution 35 in the radial setting position corresponding to the second operating position of the clutch. In both positions the gear rim 41 with its teeth engages the teeth 43 of the crown gear 31.

The clutch itself as the coupling part can move radially between the first and second operating position, has a bushing 47 concentrically surrounding the shaft 37 of the body of revolution 35 and forms a pivoted support of the body of revolution 35 forming the output-side gear part. On the antifriction bearing 49 which is away from the turret axis 13, the bushing 47 has a shaft locking ring 51 by which the bushing 47 entrains the body of revolution 35 in a displacement motion directed radially to the outside into the first operating position. In displacement motions of the bushing 47 radially to the inside into the second operating position of the clutch, the bushing 47 entrains the body of revolution 35 by contact of the bearing 49 with the stepped surface 70 of the bushing 47.

In the embodiment shown, actuation of the clutch takes place hydraulically. For this purpose, the bushing 47 on the outer peripheral side has a projecting ring body 53 which acts as an annular piston guided in an annular guide section 55. In guide section 55, the piston forms a separating element between the first pressure chamber 57 (FIGS. 1 and 2) and the second pressure chamber 59 (FIG. 3). The guide section 55 is guided for pivoting motions around the turret axis 13 on a guide body 61 in the tool disk 7.

FIGS. 1 and 2 show the clutch in the first operating position in which the pressure chamber 57 is supplied with a hydraulic medium so that the bushing 47 has moved radially to the outside into the position in which the end-side drivers 63 lock the bushing 47 on the driver surfaces 65 of the tool disk 7. In this operating position the body of revolution 35 used as the output-side gear part with its gear rim 41 is moved radially away from the support column 11, but remains with its gear rim 41 by its teeth engaged with the teeth 43 of the crown gear 31 so that a rotary tool held in the tool mounting 44 can be driven. A machining process can therefore be carried out with the pertinent rotary tool, regardless of in which rotary position the tool station 45 is set on which the tool mounting 44 of the pertinent rotary tool is located, by turning the tool disk 7.

FIG. 3 shows the positions corresponding to the second operating position of the clutch. At this point the other pressure chamber 59 is supplied with hydraulic fluid so that the ring body 53 of the bushing 47 used as an annular ring piston and, accordingly, the bushing itself are moved radially to the inside. In this position the drivers 63 of the bushing 47 are pulled back from the driver surfaces 65 of the tool disk 7. Pivoting motions of the tool disk 7 around the turret axis 13 therefore do not lead to entrainment of the body of revolution 35 forming the output-side gear part of the tool drive. The tool drive therefore remains in a given position regardless of the rotary setting motions of the tool disk 7.

So that the guide body 61 is securely fixed in the rotary setting motion of the tool disk 7 in its angle position relative to the turret axis 13, the body of revolution 35 in the position pushed to the inside (i.e., the second operating position of the clutch) must be fixed in a defined initial position (i.e., in the position which is preferred for operation of the rotary tool). This fixing takes place such that in the position pushed to the inside a flattened part 71 of the body of revolution 35 presses through a passage 69 of the guide body 61 onto the flattened end sections 72 of the support column 11. The body of revolution 35 is then fixed against rotation on the support column 11. At this juncture, in the position of the body of revolution 35 pushed radially to the inside (i.e., the second operating position of the clutch), the body of revolution 35 must be fixed in a defined initial position (i.e., in a position which is preferred for operation of the rotary tool). In this configuration the transfer of the clutch into the second operating position presupposes exact alignment of the tool drive, i.e., of the body of revolution 35, into a defined rotary position. Position sensors (not shown) corresponding to prior art control these operating functions both with respect to the control of operating functions of the clutch and the setting of the rotary positions of the tool disk 7.

While one embodiment has been chosen to illustrate the invention, it will be understood by those skilled in the art that various changes and modifications can be made therein without departing from the scope of the invention as defined in the appended claims.

What is claimed is:

1. A tool turret, comprising:
a base body mountable to a machine tool and defining a turret axis;
a tool disk pivotably mounted on the base body, being pivotable about said turret axis and having a tool disk periphery;
a plurality of tool stations distributed on said tool disk periphery and being movable to at least one working position at a time by pivoting said tool disk about said turret axis;
a tool drive located within said tool disk and having an output-side gear part rotatable around a radial axis of rotation radial to said turret axis, said output-side gearing part being couplable to a tool-side coupling part for driving at least one tool located on the tool station aligned to the at least one working position; and
a clutch in said tool disk, said clutch being switchable between a first operating position in which said output-side gear part pivots with said tool disk around the turret axis and is connected to said tool disk, and a second operating position in which said output-side gear part is decoupled from said tool disk so as not to pivot with said tool disk around said turret axis during rotation of said tool disk around said turret axis.

2. The tool turret according to claim 1, wherein
said clutch has a bushing as a movable coupling part, said bushing forming a rotary support of said output-side gear part for rotation of said output-side gear part around said radial axis of rotation; and
said bushing is movable in said tool disk in a direction of said radial axis of rotation between the first operating position and the second operating position, in the first operating position, said bushing being in a radially advanced position in which end-side drivers of said bushing engage driver surfaces of said tool disk.

3. The tool turret according to claim 2, wherein
said output-side gear part, as a further component of said clutch, together with said bushing is radially movable in the direction of said radial axis of rotation in said tool disk; and
said output-side gear part, in the second operation position, has been moved to a position shifted radially with respect to said turret axis to the inside of said tool turret, in which radially inside position the output-side gear part is secured on said base body against pivoting motion around said turret axis.

4. The tool turret according to claim 3, wherein
said tool drive comprises an angle drive with a drive-side crown gear rotatable around said turret axis and having teeth lying in a plane extending radially relative to said turret axis, said teeth having a radial extension such that teeth of said output-side gear part remain engaged with said teeth of said crown gear when said output-side gear part is in both of said first and second operating positions.

5. The tool turret according to claim 3 wherein
said base body has a central support column defining said turret axis, said tool disk being pivotable about said control support column; and
a guide body is within said tool disk, said bushing and said output-side gear part supported in said bushing are guided both for radial movements of said bushing and said output-side gear part in the direction of said radial axis of rotation between the first and second operating positions and for pivoting movements of said bushing and said output-side gear part around said turret axis.

6. The tool turret according to claim 5, wherein
in the second operating position of said clutch, a flattened part of the output-side gear part extends through a passage of the guide body to press onto flattened end sections of said support column, fixing said guide body in an angular position thereof with respect to said turret axis.

7. The tool turret according to claim 5, wherein
a drive-side crown gear of said tool drive is mounted on a hollow shaft surrounding said support column.

8. The tool turret according to claim 7, wherein
to fix the rotary position of the tool disk about said turret axis, a clamping mechanism between said base body and said tool disk fixes rotary positions of said tool disk.

9. The tool turret according to claim 2, wherein
an outer peripheral side of the bushing has a projecting ring body acting as a movable annular piston and separating pressure chambers from one another made in a guide section on which said bushing is guided during for displacement motions of said bushing between the first and second operating positions, said pressure chambers being selectively supplied with hydraulic medium.

10. The tool turret according to claim 1 wherein said clutch is moved into the first and second operating positions using a hydraulic actuator.

11. The tool turret according to claim 1, wherein a drive for pivoting motions of said tool disk is around and coaxial to said turret axis, said drive comprising a torque motor having an outer rotor connected to said tool disk for direct driving of said tool disk.

\* \* \* \* \*